(12) United States Patent
Walton et al.

(10) Patent No.: US 7,441,850 B1
(45) Date of Patent: Oct. 28, 2008

(54) GENERIC INK JET HEAD FIRE LOGIC

(75) Inventors: Derek T. Walton, Bolton, MA (US);
John J. Koger, Newton, MA (US)

(73) Assignee: Conexant Systems, Inc., Newport Beach, CA (US)

( * ) Notice: Subject to any disclaimer, the term of this patent is extended or adjusted under 35 U.S.C. 154(b) by 330 days.

(21) Appl. No.: 11/032,633

(22) Filed: Jan. 10, 2005

Related U.S. Application Data (60) Provisional application No. 60/535,229, filed on Jan. 9, 2004.

(51) Int. Cl.
*B41J 29/38* (2006.01)
(52) U.S. Cl. .......................................... 347/9
(58) Field of Classification Search ................ 347/9
See application file for complete search history.

(56) References Cited

U.S. PATENT DOCUMENTS 5,420,616 A * 5/1995 Suemitsu et al. ............ 347/154
5,868,075 A * 2/1999 Kline et al. ................. 101/467
6,652,058 B2 * 11/2003 Kanematsu et al. .......... 347/14

* cited by examiner

*Primary Examiner*—Matthew Luu
*Assistant Examiner*—Shelby Fidler
(74) *Attorney, Agent, or Firm*—John R. Thompson; Stoel Rives LLP (57) ABSTRACT

An inkjet firing architecture for use in association with a device utilizing an ink jet head. The inkjet firing architecture includes a fire synchronization block including an N-entry delay line, at least one vector sequencing block, and a vector compositing block. The N-entry delay line is operable to simultaneously delay multiple incoming external events for varying periods of time prior to passing each of the events to one of M event sub-dividing stages and provide a fire synchronization block output that is related at least in part to the delayed incoming external events. Each of the M event sub-dividing stages emits a programmable series of sub-events, each of the sub-events being separated in time by a sub-event interval. Each programmable series of sub-events ends with an independent Mth level sub-event that is passed along as the fire synchronization block output to the at least one vector sequencing block.

21 Claims, 7 Drawing Sheets

GENERIC INK JET HEAD FIRE LOGIC

REFERENCE TO PENDING PRIOR PATENT APPLICATION

This patent application claims benefit of prior U.S. Provisional Patent Application Ser. No. 60/535,229, filed Jan. 9, 2004 by Derek T. Walton et al. for GENERIC INK JET HEAD FIRE LOGIC.

The above-identified patent application is hereby incorporated herein by reference.

FIELD OF THE INVENTION

This invention relates to office automation products in general, and more particularly to printers, fax machines, scanners, copiers and the like. Even more particularly, this invention relates to the integration of formerly separate functions into single devices such as those sometimes referred to as MFPs (Multi-Functional-Peripherals), and the integration of multiple functions into a single ASIC (Application Specific Integrated Circuit) such as those produced by Oasis Semiconductor, Inc. of Waltham, Mass.

BACKGROUND OF THE INVENTION

Today's very competitive market for consumer ink jet MFP (Multi-Functional-Peripherals) products has placed great pressure on manufacturer's to reduce system cost and thus end user price. This cost pressure, in turn, has caused the MFP electronics to evolve such that, typically, a single, low-cost SoC ASIC performs all of the system data processing functions. For a scan-copy-print MFP, for example, a single chip is typically used to control and acquire data from the scanner mechanism, communicate with the host PC, perform image processing, and control and drive the print mechanism.

The Problem

One of the most significant challenges in developing a universal MFP controller SoC ASIC is designing the ink jet firing subcomponent to be flexible enough to support the wide variety of different ink jet printing systems. While it is true that the various manufacturers' ink jet printing systems are often based on the same fundamental principles (i.e., piezoelectric or thermal-induced ejection of ink drops), each manufacturer's technology has traditionally been very close guarded and has evolved quite differently and independently.

Today, the differences in ink jet technology from manufacturer to manufacturer are vast, including, but not limited to, the following:

(1) number and physical location of nozzles;
(2) number and grouping of nozzles which are fired simultaneously (i.e., fire groups);
(3) number, shape, polarity, and duration of ink ejection fire pulses;
(4) nozzle fire frequency and recovery interval between fires;
(5) number of clocks, addresses and data signals, and associated signaling protocol, used to specify which nozzles should be fired;
(6) method to advance through printhead fire groups (i.e., addresses);
(7) separate data and address lines vs. combined address/data signals; and
(8) method of maintaining minimum head temperature by
  (a) short, non-nucleating fire pulses; and
  (b) separate substrate heater.

Prior Approaches

A variety of straightforward designs for a flexible ink jet firing subcomponent (i.e., one that supports one or more different ink jet printing systems) are known in the art.

(i) Tailored SoC Per Ink Jet Technology

One possible approach, of course, is to develop a separate, tailored SoC ASIC to address each of the different manufacturers' ink jet technology. This approach, however, sacrifices the economies of scale which could otherwise be obtained with a single SoC ASIC deployable in multiple manufacturers' systems.

(ii) Multiple Head Fire Modules Per SoC, One for Each Ink Jet Technology

Another approach is to integrate, within a single SoC, multiple head fire modules, one for each of the different ink jet technologies to be supported by the SoC ASIC. When the number of different ink jet technologies is small (e.g., N<3), this may very well be a tenable solution. However, as N gets large, the cost in terms of additional development effort (N different modules must be designed, verified, and tested) and chip die size (N modules present on die, only one used at a time) become prohibitive.

(iii) Support for Multiple Ink Jet Technologies in a Single Fixed Function Block Yet another approach is to design a single fixed function module which is capable of supporting multiple ink jet technologies. Again, for small N, this may be an efficient solution. However, as N gets large, the complexity of designing a single, die-size efficient, fixed function block which supports multiple ink jet technologies becomes prohibitive.

(iv) Lack of Adaptability

A significant common disadvantage of all of the above mentioned prior approaches is that each relies on a perfect and complete knowledge of the ink jet technologies at SoC ASIC design time. Such knowledge is often unavailable, as manufacturers are commonly very reticent to disclose detailed information until an MFP project is well under way. In other cases, the manufacturers may have themselves not yet sufficiently defined the ink jet technology at the SoC ASIC design time.

Lack of adaptability ultimately leads to missed design wins (if the SoC ASIC is just not suitable), increased system cost (if the system board requires additional logic such as discretes, PAL, or FPGA for adaptation), or schedule delays (if an ASIC design and fabrication cycle is required to adapt an existing SoC ASIC).

The Goal

Thus, there is a need for low cost universal MFP SoC ASICs which can function as the controller ASICs within a variety of different manufacturers' product offerings

SUMMARY OF THE INVENTION

The present invention solves this problem by providing a fundamental change in the approach to designing logic to fire ink jet heads. Instead of an implementation which uses one or more fixed function modules to support one (or a small number of) ink jet technologies, a highly programmable ink jet head architecture is provided which can address the gamut of ink jet head technologies.

By developing a single SoC ASIC which can be adopted by many manufacturers, one can take advantage of economies of scale. Pooling chip volumes across multiple customers allows one to amortize the NRE (non-recurring engineering) expenses associated with chip development/fabrication as well as negotiate the lowest possible volume pricing.

In one preferred form of the invention, there is provided an inkjet firing architecture for use in association with a device utilizing an ink jet head, the architecture comprising:
  a fire synchronization block;
  at least one vector sequencing block; and
  a vector compositing block.

In another preferred form of the invention, there is provided a method for controlling the firing of inkjet nozzles in an inkjet head in response to multiple external events, comprising the steps of:
  transmitting each of the multiple external events to a N-entry delay line component of a fire synchronization block;
  independently delaying each of the multiple events for a period of time;
  computing an event interval to be associated with each of the multiple external events;
  passing each of the multiple external events and the associated event interval to a set of M event sub-dividing stage components of the fire synchronization block;
  converting each of the multiple events to a series of sub-events with associated sub-event intervals, wherein each series of sub-events ends with an independent Mth level sub-event;
  using each of the independent Mth level sub-events to initiate a period of activity in a vector sequencing block, wherein the activity produces an output vector;
  combining all output vectors in a vector compositing block to form a single composite output vector; and
  delivering the single composite output vector to the inkjet head.

In another preferred form of the invention, there is provided a print head actuation architecture for use in association with a device utilizing a print head, the architecture comprising:
  a fire synchronization block;
  at least one vector sequencing block; and
  a vector compositing block.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

General System Construction

Figure 1:
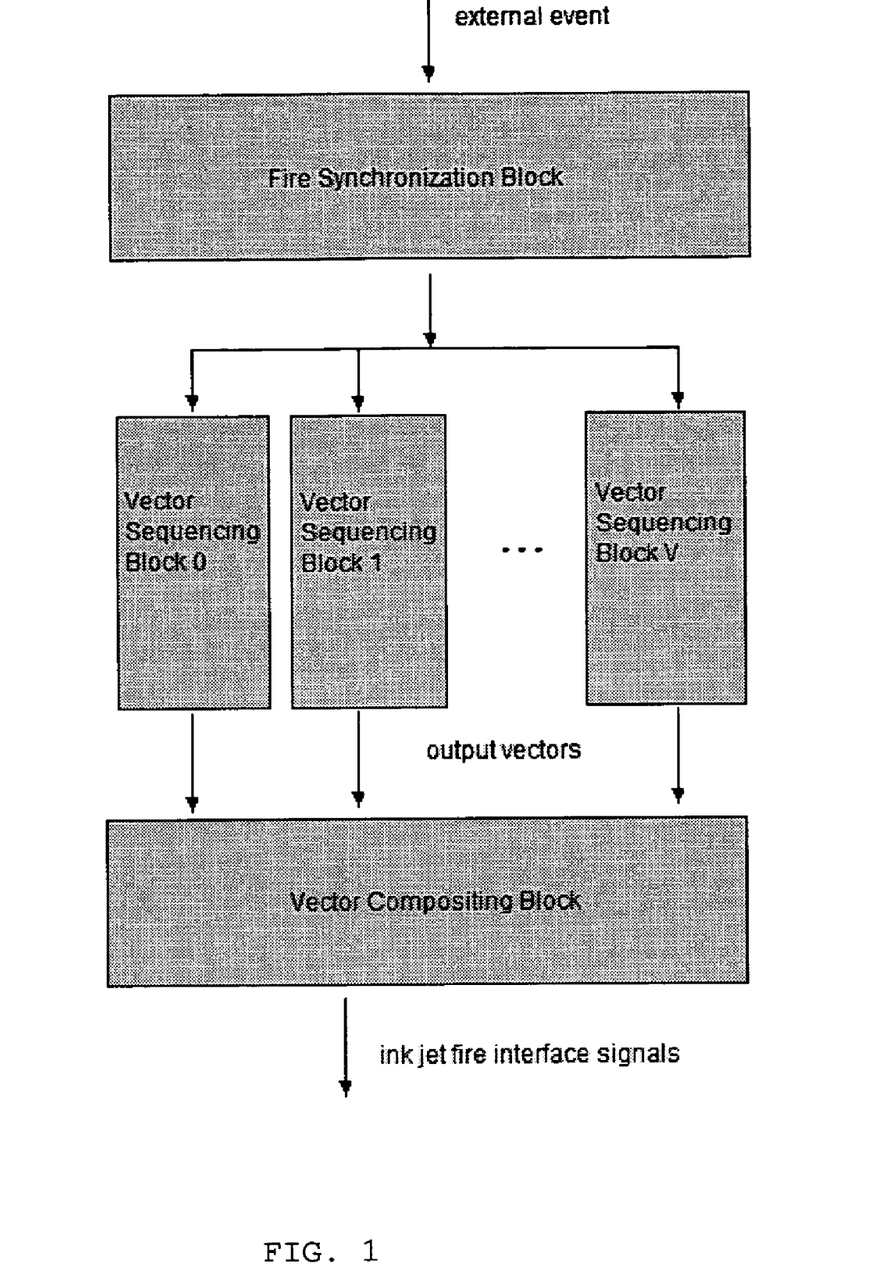
FIG. 1 is a schematic illustration showing the new ink jet fire architecture of the present invention.

Looking first at FIG. 1, in its most general embodiment, the generic ink jet fire architecture consists of 3 distinct components: a fire synchronization block, one or more vector sequencing blocks, and a vector compositing block.

Fire Synchronization Block

Figure 2:
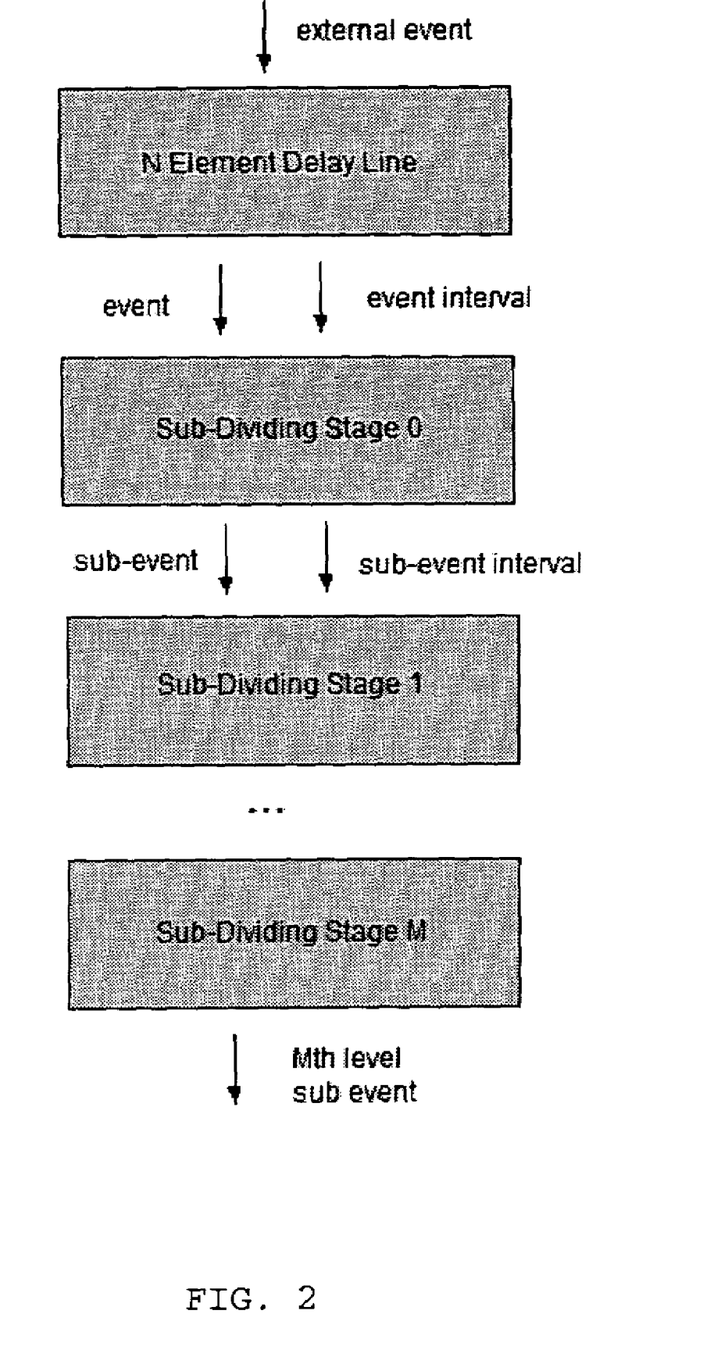
FIG. 2 is a schematic illustration showing the fire synchronization block of the present invention.

Looking next at FIG. 2, the fire synchronization block is used to initiate periods of ink jet firing activity appropriately in time with respect to external events. Such external events include, but are not limited to, the arrival of an ink jet head carrier at specific, pre-defined positions as the carrier makes a printing pass across a sheet of paper, etc.

The fire synchronization block consists of an N entry delay line and M event sub-dividing stages.

(i) N-Entry Delay Line

Figure 3:
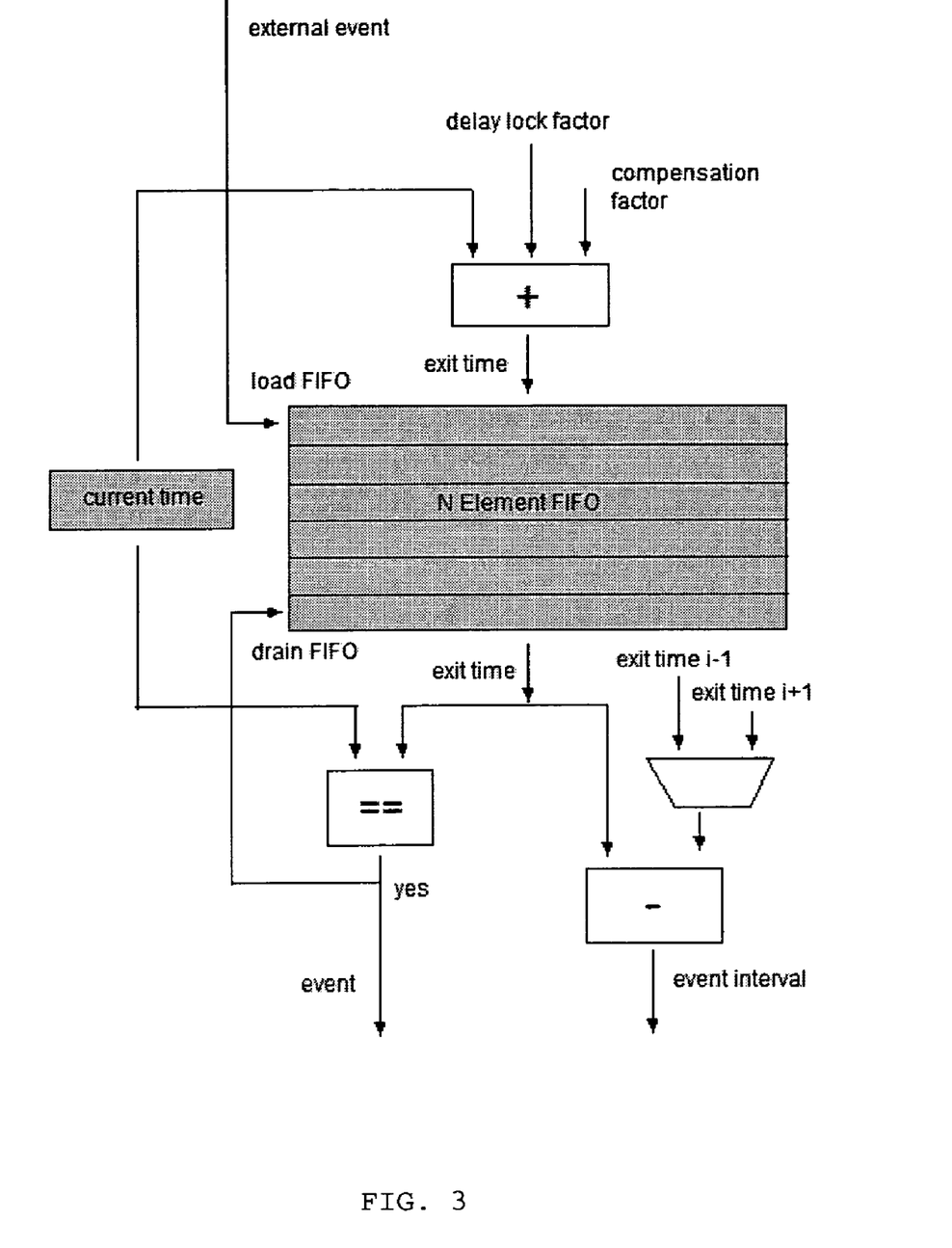
FIG. 3 is a schematic illustration showing the N-entry delay line of the present invention.

Looking next at FIG. 3, the N entry delay line serves to delay incoming events for chosen periods prior to passing the events on to the sub-dividing stages. The delay line contains multiple (i.e., N) entries such that at any point in time the delay line can be simultaneously delaying multiple incoming events.

Incoming events are added to the delay line by loading them into a FIFO, based upon the time at which the event should exit the delay line. This exit time is computed by adding, to the time of arrival at the delay line, the sum of a delay lock factor and a compensation factor.

The delay lock factor is computed by multiplying (i) the time difference between the current incoming event and the immediately-preceding incoming event by (ii) a phase factor. The phase factor in turn is a control-state register which can be manipulated by firmware. One use for the phase factor is to effectively lock the phase relationship between events entering and exiting the delay line.

The compensation factor is a value which is derived from a control-state register which can be manipulated by firmware as the inkjet head firing is in progress. This compensation factor can be used to fine tune the relationship between delay line outgoing events (i.e., nozzle firings) and delay line incoming events (i.e., carrier positions). The compensation factor can be used to compensate for a variety of contributions to nozzle positioning errors. For example, the compensation factor can be used to compensate for the variation in "fire to splat" distance which typically occurs as a result of carrier velocity variation.

The compensation factor may be derived very simply from the control-state registers by assigning the compensation factor to be equal to the value written by firmware to a control-state register.

Alternatively, the compensation factor may be derived from control-state registers controlled by the firmware in a manner which allows a large change to the target compensation factor to be metered out as a sequence of smaller changes, each of the smaller changes being applied to the compensation factor as each incoming event is received. This is accomplished by having the firmware specify both the new target compensation factor and the number of incoming events over which to make the transition from the compensation factor currently in use to the new target compensation factor. By distributing the changes over multiple incoming events, firmware can make larger, less frequent, changes to the target compensation factor without causing correspondingly large changes to the actual compensation factor which is in use. By avoiding large changes to the actual compensation factor in use, print quality degradation caused by inconsistent spacing of nozzle fires can be avoided.

The event at the output of the delay line is removed from the FIFO and passed on to downstream processing stages when the current time matches the event's exit time. As the event is removed from the delay line, an event interval is computed and passed along with the event. This interval represents the expected time until the next event exits the delay line. If conditions allow (i.e., if the FIFO contains both the exiting event and at least one other event), the event interval will be exact. Otherwise, the event interval will be a predicted value (for example, the time difference between the exiting event and the previous exiting event).

As is apparent in the discussion of the next section, it can be advantageous to foster conditions in which the event interval will be exact rather than predicted. Exact event intervals can be ensured by systematic firmware control of the delay lock and/or compensation factors. To ensure exact event intervals, firmware must manage the delay lock factor and/or compensation factor to ensure that the sum of these factors is large enough that the FIFO contains both the exiting event and at least one other event.

When provided exact values for the event intervals the sub-division process will produce sub-event intervals which are as regularly spaced as possible, and will ensure that sub-event intervals are not truncated or omitted. Truncation or omission of sub-event intervals can occur if sub-division is performed based on a predicted (rather than exact) event interval, and the actual event interval turns out to be shorter than the predicted event interval. In ink jet fire applications, truncation or omission of event intervals results in the failure to fire a subset of the ink jet nozzles, and thus can produce objectionable print defects.

(ii) Event Sub-Dividing Stages

Figure 4:
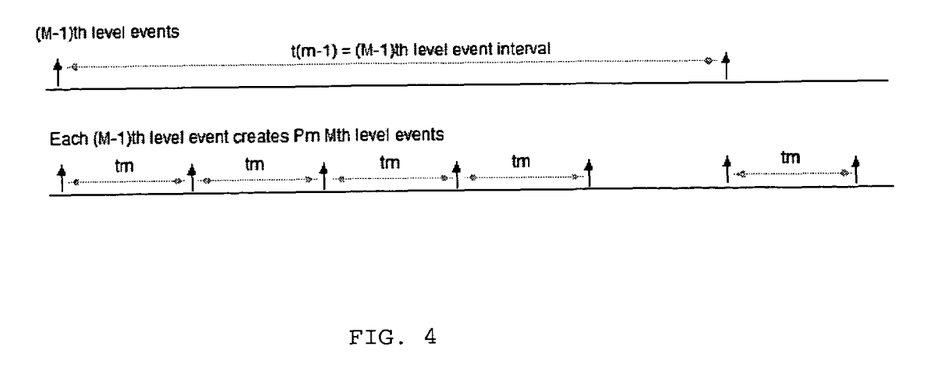
FIG. 4 is a schematic illustration showing the event sub-dividing stages of the present invention.

Looking next at FIG. 4, the event and event intervals are next processed by a set of M event sub-dividing stages. These sub-dividing stages convert the coarse-grained (typically carrier position keyed) external events into the finer-grained, more frequent events required to initiate nozzle firing activity.

Each sub-dividing stage, for instance, could emit a programmable number of sub-events (say Pm), separated in time by a sub-event interval (say tm) equal to some fraction (say f) times the incoming event interval (t(m−1)). Alternatively, the sub-event interval could be a fixed time period from a control-state register written by firmware. Or, the sub-event interval could be the maximum or minimum of the aforementioned methods of computing the sub-event interval. Still other options will be obvious to persons skilled in the art in view of the present disclosure.

Event sub-dividing stages can also be cascaded to form sub-sub-events with associated sub-sub-intervals, etc.

The final sub-dividing stage will emit Mth level sub-events which then are passed to the vector sequencing blocks.

It is possible for the implementations of fire synchronization logic to be far simpler than outlined within the description of the above section. For instance, the N-entry delay line may not be necessary in some cases and could be replaced by logic which immediately passes on incoming events to the subdivision logic along with a predicted interval based on the time between the current incoming event and the previous incoming event. Furthermore, in some situations, the event subdivision stages can be omitted entirely. In other words, input events to the subdivision logic could be passed without subdivision to the vector sequencing blocks. Taken to the extreme, it is possible to simplify the fire synchronization logic such that incoming events are passed without delay or subdivision to the vector sequencing blocks.

It should be appreciated that the use of N-element delay line in combination with compensation and/or delay lock factors can produce "exact" intervals, thereby avoiding truncation or omission of sub-intervals.

Vector Sequencing Blocks

Upon receiving an Mth level sub-event (hereinafter sometimes referred to herein as an "event" for convenience) from the fire synchronization block, each of the one or more of the vector sequencing blocks will initiate a period of activity. In a preferred construction, the system uses 2 vector sequencing blocks. One typically provides control signals for the ink jet heads and one typically provides the data which represents which nozzles to fire. The result of this activity is a sequence of transitions on the vector sequence blocks' outputs (output vectors). The end goal of the output vector transitions is, of course, to create a sequence of transitions which, when operated on by the vector compositor, produces a sequence of signal transitions on the ink jet head control lines which convey and execute nozzle fires.

Many different vector sequencing block implementations may be effected.

Figure 5:
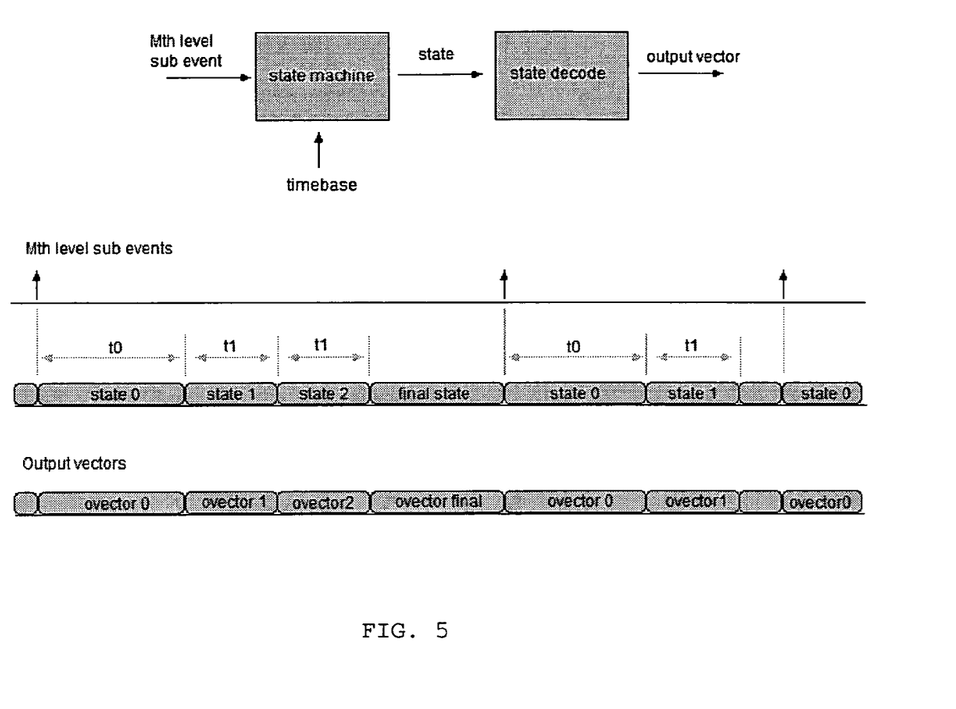
FIG. 5 is a schematic illustration showing one form of vector sequencing block of the present invention.

Looking next at FIG. 5, one example of a vector sequencing block is a state machine which advances through a fixed set of states, with each new state, for instance, producing a transition on the output vector. The state machine might begin advancing through its states a programmable period of time after it receives an incoming event. It might subsequently advance its state at equally spaced, programmable intervals until the final state is reached. It may then remain in the final state until a subsequent incoming event is received.

Figure 6:
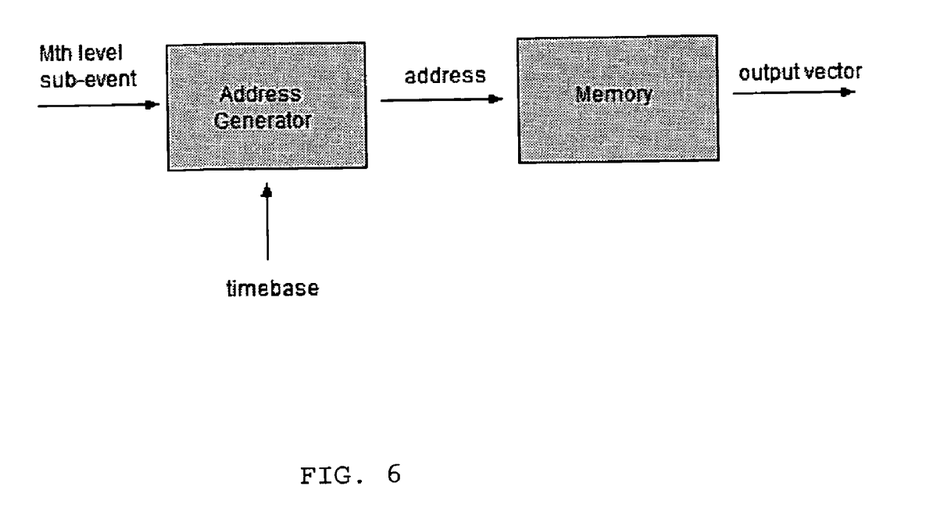
FIG. 6 is a schematic illustration showing another form of vector sequencing block of the present invention.

Looking next at FIG. 6, rather than advancing through a fixed set of states and associated output vectors, a vector sequencing block may instead output a sequence of fixed bit width vectors which it obtains by systematically reading from a memory. The first output vector may be presented at a programmable period of time after the incoming event is received, and subsequent output vectors may be presented at equally spaced, programmable intervals until a programmable number of output vectors has been delivered.

Figure 7:
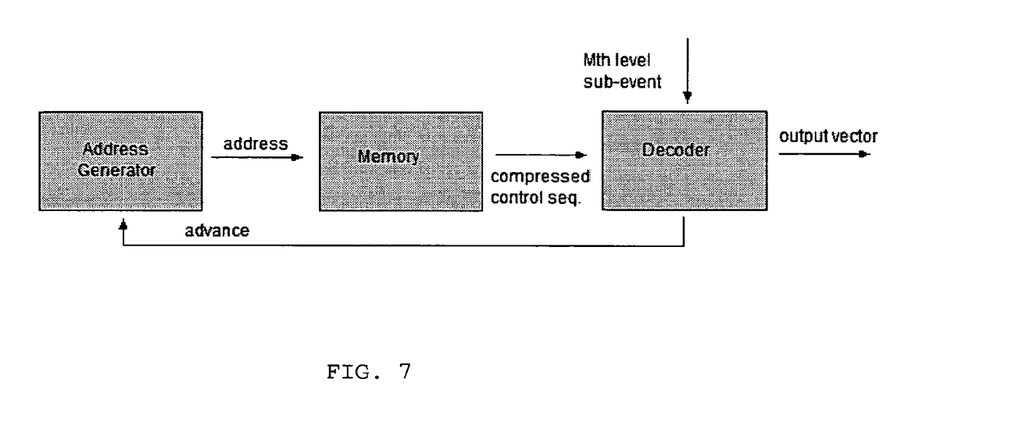
FIG. 7 shows further details of vector sequencing block of the present invention.

Looking next at FIG. 7, rather than advancing through a set of fixed size vectors which it obtains from a memory, the vector sequencing block may instead read a compressed form of the vectors from a memory, decompress the vectors, and present the vectors in a decompressed form on the output vector. The first output vector may be presented at a programmable period of time after the incoming event is received, and subsequent output vectors may be presented at equally spaced, programmable intervals until either a fixed number of vectors are delivered or an end-of-interval token is received from the compressed vector stream.

The memory described in the previous examples, may, of course, take many different forms. Possible forms include, but are not limited to, memory resident on the SoC ASIC or memory external to the SoC ASIC. The various memory forms, in turn, can be accessed by a variety of schemes including, but not limited to, as a single contiguous region, as a circular buffer, or as a set of disjoint regions.

In addition, for any of the above examples, rather than advancing through output vectors based on programmable intervals, a vector sequence block may instead advance from one output vector to the next based upon one or a combination of output vectors generated by one or more other vector sequence blocks.

Vector Compositing Block

The V output vectors from the V vector sequence blocks are combined by the vector compositing block to form a single composite output vector which is then delivered to the SoC ASIC pins, and via the printed circuit board, and cables, to the ink jet head.

Many different techniques and operators can be used to combine the V individual output vectors into a single composite vector.

Perhaps the simplest form which the vector compositing block can take is one in which the individual input vectors are concatenated to form a composite output vector whose width is the sum of the widths of the output vectors from the vector compositing blocks. In this form, the V output vectors are essentially presented unmodified to the SoC ASIC pins. This turns out to be a useful case for some ink jet engines.

For instance, the vector compositing block may opt to invert selected bits in the output vectors received from the vector sequence blocks, left shift each of the results, bitwise or to obtain a single vector, and finally invert selected bits to form the final composite output vector. Of course, in this sequence, the bits selected for inversion at each stage, as well as the left shift amounts, would be determined by control-state registers programmable by firmware.

Of course, a more complete set of combinational logic operations could also be implemented as part of the vector compositing block, including a richer set of ALU operations (i.e., AND, XOR, and MUX operations).

Another possibility is to define bit patterns within one or more of the V output vectors from the vector generators which, when detected, cause additional vectors to contribute to the composite vector output. The additional vectors, for instance, could be derived from a control-state register programmable by firmware, a pulse-width modulation circuit, or a state machine of arbitrary complexity.

Preferred Embodiment

The generic ink jet fire architecture is a scalable architecture which provides for limitless flexibility in controlling ink jet head firing. In a preferred construction, good design practice dictates that the implementation be flexible enough to address a reasonably varied set of ink jet technologies yet not overly flexible so as to avoid burdening the ASIC with unnecessary cost.

Additional Embodiments

While the present invention has been discussed in terms of its application to ink jet firing, it should be appreciated that the invention is equally suited to drive other print heads, including, but not limited to, thermal print heads used within thermal transfer printers such as are used within many fax machines and thermal print heads used within thermal transfer dye sublimation printers, etc.

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. An inkjet firing architecture for use in association with a device utilizing an ink jet head, the architecture comprising:
   a fire synchronization block comprising an N-entry delay line operable to simultaneously delay multiple incoming external events for varying periods of time prior to passing each of the events to one of M event sub-dividing stages and to provide a fire synchronization block output that is related at least in part to the delayed incoming external events, wherein each of the M event sub-dividing stages emits a programmable series of sub-events, each of the sub-events being separated in time by a sub-event interval;
   at least one vector sequencing block operable to receive the fire synchronization block output and to provide at least one of a control signal for the ink jet head and data related to selected nozzles to be fired as a vector sequencing block output; and
   a vector compositing block to form a composite output vector by combining output from the at least one vector sequencing block, and to provide the composite output vector to the ink jet head;
   wherein each programmable series of sub-events ends with an independent Mth level sub-event that is passed along as the fire synchronization block output to the at least one vector sequencing block.

2. The inkjet firing architecture of claim 1, wherein an exit time is calculated for each incoming external event by adding to a time of entry in the N-entry delay line a delay lock factor and a compensation factor, and wherein each incoming event is loaded into a First In First Out (FIFO) buffer, based at least in part upon a calculated exit time.

3. The inkjet firing architecture of claim 2, wherein the delay lock factor is calculated by:
   determining a time difference between a current incoming event and an immediately preceding incoming event; and
   multiplying the time difference by a phase factor.

4. An inkjet firing architecture according to claim 1 wherein at least one vector sequencing block outputs a sequence of fixed bit width output vectors obtained by systematically reading from a memory.

5. An inkjet firing architecture according to claim 1 wherein the at least one vector sequencing block reads a compressed form of output vectors from a memory, decompresses the output vectors and outputs the decompressed output vectors.

6. An inkjet firing architecture according to claim 5, wherein the memory is selected from memory resident on an SoC ASIC and memory external to the SoC ASIC.

7. The inkjet firing architecture of claim 1, wherein a first vector sequencing block is operable to produce a first series of output vectors comprising control signals for the inkjet head, and a second vector sequencing block is operable to produce to produce a second series of output vectors comprising data that represents which nozzles to fire.

8. The inkjet firing architecture of claim 1, wherein the composite output vector further includes vectors derived from a source selected from a control state register programmable by firmware or a pulse-width modulation circuit.

9. A computer chip comprising the ink jet firing architecture of claim 1.

10. The computer chip of claim 9, wherein the computer chip is a universal multifunction peripheral architecture chip.

11. The inkjet firing mechanism of claim 1, wherein the fire synchronization block is operative to:
   receive N incoming events, each incoming event separated in time from a subsequent incoming event by a corresponding incoming time interval, wherein the incoming time intervals between the N incoming events can be characterized by a first set of intervals;
   from those incoming events, create Y outgoing events based at least in part on the incoming events, wherein time intervals between the Y outgoing events can be characterized by a second set of intervals.

12. The inkjet firing mechanism of claim 11, wherein N<Y.

13. The inkjet firing mechanism of claim 11, wherein the second set of intervals are substantially equal in value.

14. The inkjet firing mechanism of claim 1, wherein said ink jet fire architecture comprises two vector sequencing blocks.

15. The inkjet firing mechanism of claim 14, wherein one of the vector sequencing blocks is operative to provide one or more control signals to the ink jet head.

16. The inkjet firing mechanism of claim 14, wherein one of the vector sequencing blocks is operative to provide data representing which nozzles to fire.

17. A print head actuation architecture for use in association with a device utilizing a print head, the architecture comprising:
   a fire synchronization block comprising an N-entry delay line operable to simultaneously delay multiple incoming external events for varying periods of time prior to passing each of the events to one of M event sub-dividing stages and to provide a fire synchronization block output that is related at least in part to the delayed incoming external events, wherein each of the M event sub-dividing stages emits a programmable series of sub-events, each of the sub-events being separated in time by a sub-event interval;
   at least one vector sequencing block operable to receive the fire synchronization block output and to provide a control signal for the print head as a vector sequencing block output; and
   a vector compositing block to form a composite output vector by combining output from the at least one vector sequencing block, and to provide the composite output vector to the print head;
   wherein each programmable series of sub-events ends with an independent Mth level sub-event that is passed along as the fire synchronization block output to the at least one vector sequencing block.

18. The print head actuation architecture of claim 17, wherein said print head comprises an ink jet head.

19. A print head actuation architecture according to claim 17 wherein said print head comprises a thermal print head.

20. A print head actuation architecture according to claim 19 wherein said print head comprises a thermal transfer print head.

21. A print head actuation architecture according to claim 17 wherein said print head comprises a thermal transfer dye sublimation print head.

* * * * *

UNITED STATES PATENT AND TRADEMARK OFFICE
CERTIFICATE OF CORRECTION

PATENT NO.        : 7,441,850 B1                                                      Page 1 of 1
APPLICATION NO. : 11/032633
DATED             : October 28, 2008
INVENTOR(S)       : Derek T. Walton et al.

It is certified that error appears in the above-identified patent and that said Letters Patent is hereby corrected as shown below:

Column 1, Line 28 reads, "...pressure on the manufacturer's..." which should read "...pressure on the manufacturers..."

Column 2, Line 67 reads, "...product offerings" which should read "...product offerings."

Column 8, Lines 65-66 reads, "...is operable to produce to produce a second..." which should read "...is operable to produce a second..."

Signed and Sealed this

Nineteenth Day of May, 2009

JOHN DOLL
*Acting Director of the United States Patent and Trademark Office*